(12) United States Patent
Yamaguchi et al.

(10) Patent No.: US 10,784,629 B2
(45) Date of Patent: Sep. 22, 2020

(54) CONNECTOR WITH FRONT AND REAR PORTIONS TO PREVENT MOVEMENT OF INNER STRUCTURE AND HARNESS CONTAINING SAME

(71) Applicant: Japan Aviation Electronics Industry, Limited, Tokyo (JP)

(72) Inventors: Takahiro Yamaguchi, Tokyo (JP); Yuta Shimomaki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 16/580,197

(22) Filed: Sep. 24, 2019

(65) Prior Publication Data
US 2020/0153169 A1 May 14, 2020

(30) Foreign Application Priority Data
Nov. 8, 2018 (JP) .................................. 2018-210164

(51) Int. Cl.
*H01R 13/6582* (2011.01)
*H01R 13/42* (2006.01)
(Continued)

(52) U.S. Cl.
CPC ......... *H01R 13/6582* (2013.01); *H01R 13/42* (2013.01); *H01R 13/502* (2013.01);
(Continued)

(58) Field of Classification Search
CPC ........... H01R 13/6272; H01R 13/6582; H01R 13/42; H01R 13/502; H01R 13/516;
(Continued)

(56) References Cited

U.S. PATENT DOCUMENTS 9,257,797 B2* 2/2016 Kuang ................... H01R 9/038
10,069,269 B2* 9/2018 Takahashi .......... H01R 13/5221
(Continued)

FOREIGN PATENT DOCUMENTS

JP 2002-319456 A 10/2002
JP 2009-245642 A 10/2009
(Continued)

OTHER PUBLICATIONS

European Search Report in EP 19199847.5-1201,d dated Mar. 25, 2020.

*Primary Examiner* — Abdullah A Riyami
*Assistant Examiner* — Nader J Alhawamdeh
(74) *Attorney, Agent, or Firm* — Collard & Roe, P.C.

(57) ABSTRACT

The connector comprises an inner structure and an outer housing. The inner structure comprises a fit portion, which is fit to a mating fit portion of a mating connector under a mated state, and a cable-holding portion configured to hold a jacket of a cable. The fit portion comprises terminals, a holding member holding the terminals and a shell enclosing the terminals and the holding member. The cable-holding portion is located rearward of the fit portion in a front-rear direction (X-direction). The outer housing has a front holding portion and a rear holding portion. The front holding portion holds the shell to prevent a movement of the fit portion in a perpendicular plane (YZ-plane) perpendicular to the front-rear direction. The rear holding portion is located rearward of the front holding portion and holds the cable-holding portion to prevent a movement of the cable-holding portion in the perpendicular plane.

9 Claims, 11 Drawing Sheets

(51) Int. Cl.
*H01R 13/502* (2006.01)
*H01R 13/516* (2006.01)
*H01R 13/58* (2006.01)
*H01R 13/6592* (2011.01)
*H02G 3/02* (2006.01)
*H01R 107/00* (2006.01)

(52) U.S. Cl.
CPC ........... *H01R 13/516* (2013.01); *H01R 13/58* (2013.01); *H01R 13/6592* (2013.01); *H02G 3/02* (2013.01); *H01R 2107/00* (2013.01)

(58) Field of Classification Search
CPC ............... H01R 13/58; H01R 13/6592; H01R 2107/00; H02G 3/02
See application file for complete search history.

(56) References Cited

U.S. PATENT DOCUMENTS

| | | | |
|---|---|---|---|
| 10,164,371 | B2 | 12/2018 | Hara |
| 10,348,032 | B2* | 7/2019 | Yamaguchi ........ H01R 13/5804 |
| 2013/0288512 | A1* | 10/2013 | Oka ................... H01R 13/4223 439/353 |
| 2015/0295361 | A1* | 10/2015 | Miyoshi ............... H01R 13/508 439/607.58 |
| 2016/0079689 | A1* | 3/2016 | Wu ........................ B23K 26/24 439/581 |
| 2016/0322761 | A1* | 11/2016 | Wu .................... H01R 13/7175 |
| 2018/0001407 | A1 | 1/2018 | Wu et al. |
| 2018/0019547 | A1* | 1/2018 | Maesoba ............. H01R 13/506 |
| 2020/0153169 | A1* | 5/2020 | Yamaguchi ............ H01R 13/58 |

FOREIGN PATENT DOCUMENTS

| | | |
|---|---|---|
| JP | 2018-026269 A | 2/2018 |
| JP | 2018-120666 A | 8/2018 |

* cited by examiner

CONNECTOR WITH FRONT AND REAR PORTIONS TO PREVENT MOVEMENT OF INNER STRUCTURE AND HARNESS CONTAINING SAME

CROSS REFERENCE TO RELATED APPLICATIONS

This application is based on and claims priority under 35 U.S.C. § 119 to Japanese Patent Application No. JP2018-210164 filed Nov. 8, 2018, the content of which is incorporated herein in its entirety by reference.

BACKGROUND OF THE INVENTION

This invention relates to a connector comprising an inner structure configured to be attached to a cable, and an outer housing configured to accommodate the inner structure. This invention also relates to a harness comprising the cable and the connector in which the inner structure is attached to the cable and is accommodated in the outer housing.

For example, this type of connector is disclosed in JP2002-319456A (Patent Document 1), the content of which is incorporated herein by reference.

Referring to FIG. 21, Patent Document 1 discloses a shield connector (connector) 90 comprising an electrical connector (inner structure) 92 configured to be attached to a cable 98, a connector housing (outer housing) 94 configured to accommodate the inner structure 92, and a retainer 96. The inner structure 92 is provided with two stabilizers 922, and the outer housing 94 is formed with two guide channels 942. The illustrated inner structure 92 is inserted into the outer housing 94 while being turned upside down so that the stabilizers 922 are inserted into the guide channels 942, respectively. The retainer 96 is attached to the outer housing 94 after the insertion of the inner structure 92 into the outer housing 94, so that the inner structure 92 is held in the outer housing 94. When the retainer 96 is attached, the stabilizers 922 reduce wobble of the inner structure 92 in the outer housing 94.

However, the structure disclosed in Patent Document 1 cannot sufficiently reduce wobble of the inner structure in the outer housing. In particular, when the cable is pulled or moved, the inner structure might be wobbled.

SUMMARY OF THE INVENTION

It is therefore an object of the present invention to provide a connector having mechanism which reduces wobble of an inner structure even when a cable is pulled or moved.

An aspect of the present invention provides a connector attachable to a cable having a jacket and a plurality of core wires. The connector is mateable with an object, which has a mating fit portion, along a front-rear direction. The connector comprises an inner structure and an outer housing. The inner structure comprises a fit portion, a plurality of wire connection portions, a protection portion and a cable-holding portion. The fit portion is fit to the mating fit portion under a mated state where the connector and the object are mated with each other. The fit portion comprises a plurality of terminals, a holding member and a shell. The holding member holds the terminals. The shell encloses the terminals and the holding member in a perpendicular plane perpendicular to the front-rear direction. The wire connection portions and the protection portion are located rearward of the fit portion. The wire connection portions are configured to connect the terminals with the core wires of the cable, respectively. The protection portion protects the wire connection portions. The cable-holding portion is located rearward of the protection portion. The cable-holding portion is configured to directly or indirectly hold the jacket of the cable in the perpendicular plane. The outer housing has a front holding portion, an accommodation portion and a rear holding portion. The accommodation portion accommodates the protection portion. The front holding portion is located forward of the accommodation portion and holds the shell to prevent a movement of the fit portion in the perpendicular plane. The rear holding portion is located rearward of the accommodation portion and holds the cable-holding portion to prevent a movement of the cable-holding portion in the perpendicular plane.

According to an aspect of the present invention, the inner structure is held by the two holding portions, namely the front holding portion and the rear holding portion, which are apart from each other in the front-rear direction with the accommodation portion located therebetween. In particular, according to an aspect of the present invention, the front holding portion holds the shell of the inner structure to prevent a movement of the fit portion of the inner structure in the perpendicular plane, and the rear holding portion holds the cable-holding portion of the inner structure to prevent a movement of the cable-holding portion in the perpendicular plane. This mechanism reduces wobble of the inner structure even when the cable is pulled or moved.

An appreciation of the objectives of the present invention and a more complete understanding of its structure may be had by studying the following description of the preferred embodiment and by referring to the accompanying drawings.

Figure 1:
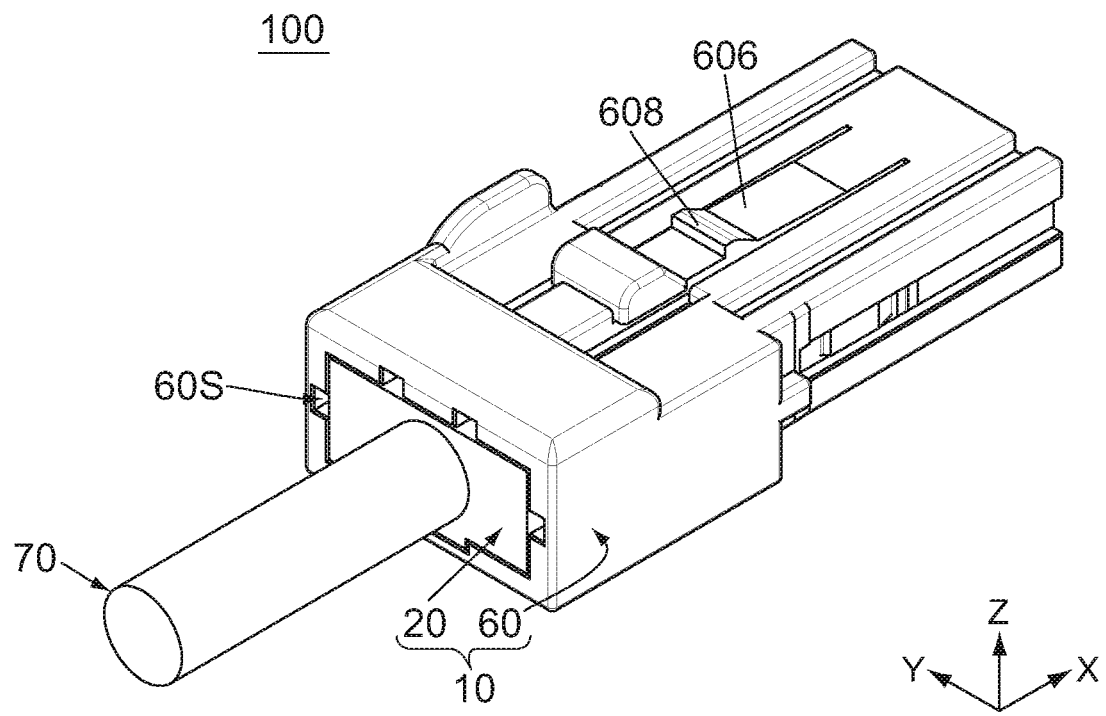
FIG. 1 is a perspective view showing a connector according to an embodiment of the present invention, wherein the connector is attached to a cable.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
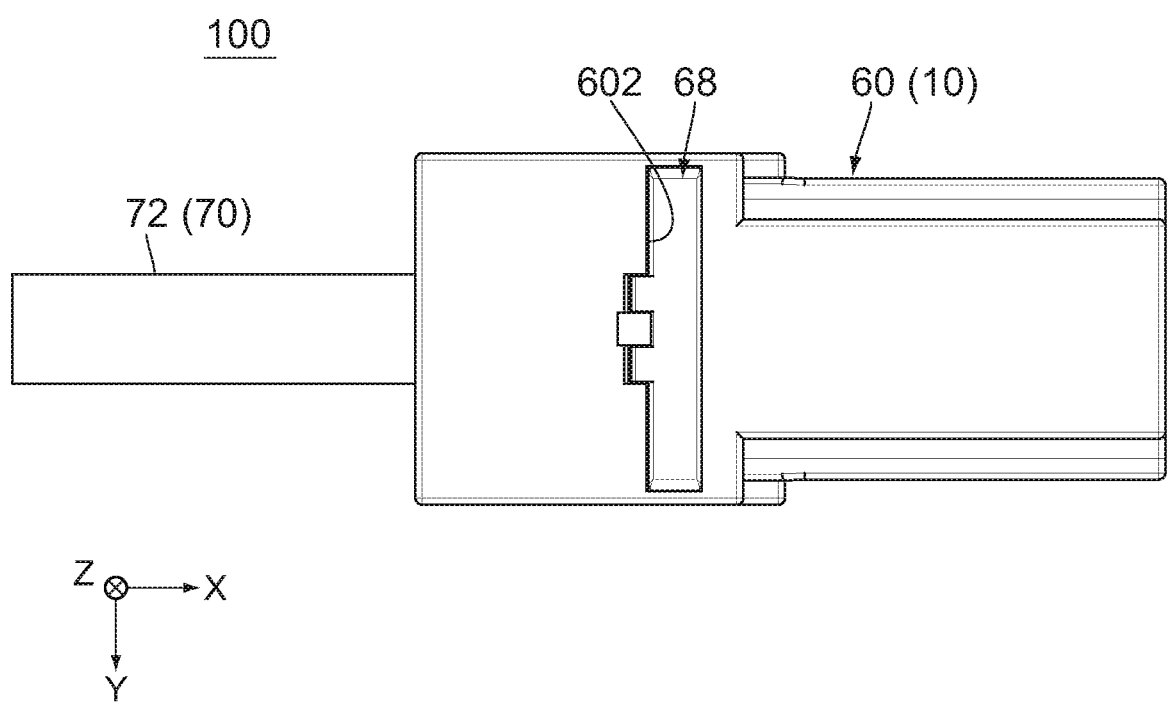
FIG. 2 is a bottom view showing the connector of FIG. 1.

Referring to FIGS. 1 and 2, a connector 10 according to an embodiment of the present invention is attachable to a cable 70. The connector 10 attached to the cable 70 forms a harness 100 together with the cable 70. Thus, the harness 100 of the present embodiment comprises the connector 10 and the cable 70.

Figure 4:
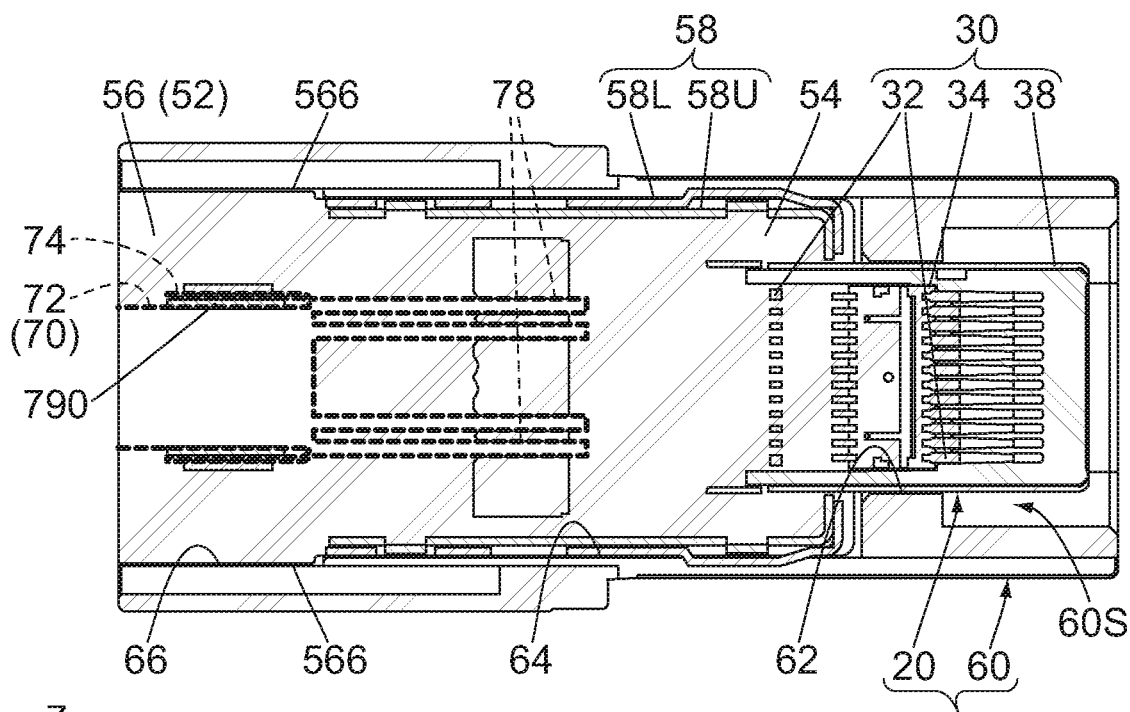
FIG. 4 is a cross-sectional view showing the connector of FIG. 3, taken along line IV-IV, wherein an outline of the inside part of the cable is illustrated with dashed line.

Referring to FIG. 4, the cable 70 of the present embodiment has a jacket 72 made of insulator, a shield 74 such as a braided wire made of metal and a plurality of core wires 78 each made of conductor. Before the cable 70 is attached to the connector 10, each of the core wires 78 is coated with an insulation coating and is covered by the shield 74. At this time, the shield 74 is covered by the jacket 72.

When the cable 70 is attached to the connector 10, a metal member 790 made of metal is wounded around a predetermined part of the jacket 72 to be swaged on the jacket 72. This predetermined part of the jacket 72 is located in the vicinity of a front end, or the positive X-side end, of the jacket 72 in a front-rear direction (X-direction). Then, a positive X-side part of the jacket 72, which is located forward of the metal member 790, is removed, so that a front end part of the shield 74 is exposed outward. The thus-exposed front end part of the shield 74 is folded back rearward, or in the negative X-direction, to be located on the jacket 72 via the metal member 790. As a result, a front end part of each of the core wires 78 is exposed outward of the jacket 72 and the shield 74. The front end part of each of the core wires 78 extends forward while the insulation coating thereof is removed.

The cable 70 of the present embodiment has the aforementioned structure. However, the structure of the cable 70 of the present invention is not specifically limited, provided that the cable 70 has the jacket 72 and a plurality of the core wires 78.

Figure 7:
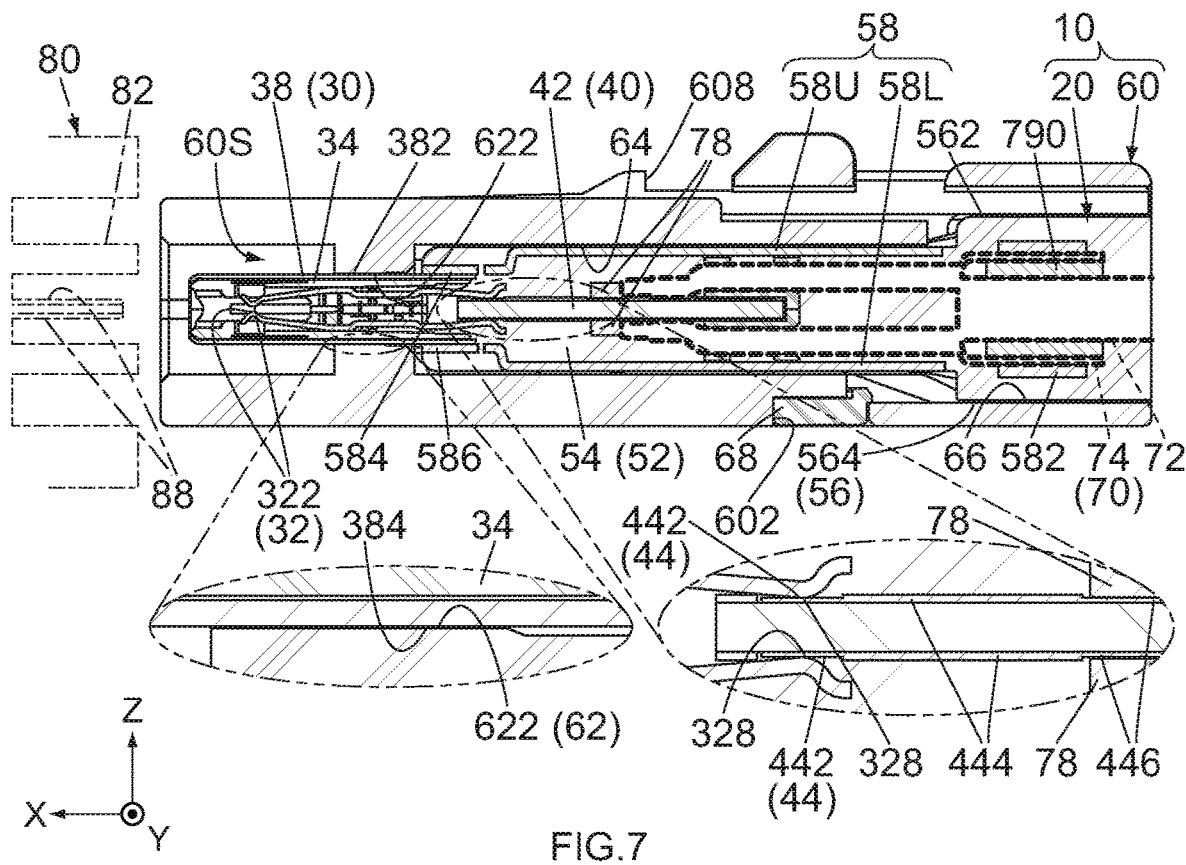
FIG. 7 is a cross-sectional view showing the connector of FIG. 6, taken along line VII-VII, wherein the outside part of the cable is not illustrated, an outline of the inside part of the cable is illustrated with dashed line, an outline of a mating connector is schematically illustrated with chain dotted lines, and two parts of the connector each enclosed by two-dot chain line are enlarged and illustrated.

Referring to FIG. 7, the connector 10 is mateable with an object (mating connector) 80, which has a mating fit portion 82, along the X-direction. In the present embodiment, the object 80 is the mating connector 80 which is a receptacle comprising a plurality of mating terminals 88, and the connector 10 is a plug mateable with the receptacle. Under a mated state where the connector 10 and the mating connector 80 are mated with each other, the cable 70 is electrically connected with an electronic device (not shown) comprising the mating connector 80. However, the present invention is not limited thereto. For example, the object 80 may be a part of a case (not shown) of the electronic device. Moreover, the connector 10 may be a receptacle.

Figure 3:
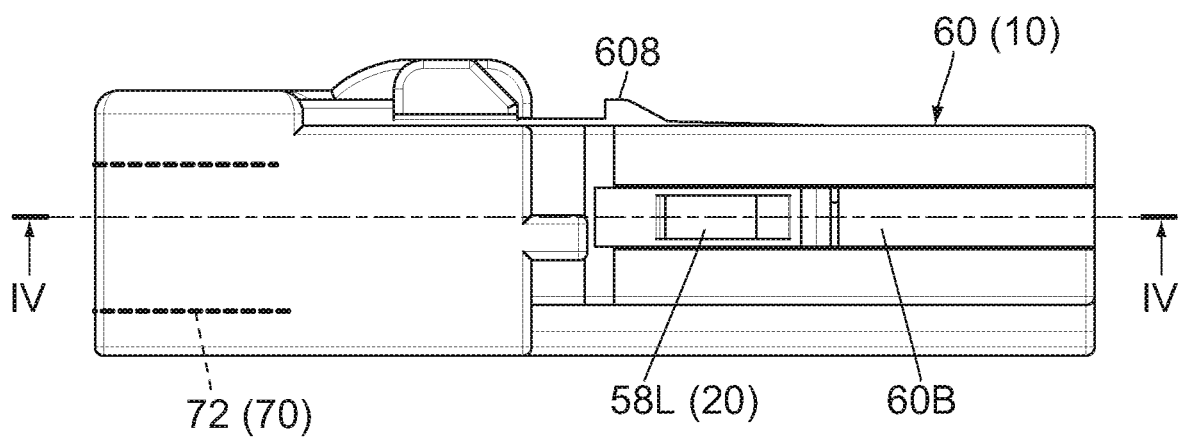
FIG. 3 is a side view showing the connector of FIG. 1, wherein an outside part of the cable which is located outside the connector is not illustrated, and an outline of a jacket of an inside part of the cable which is located inside the connector is partially illustrated with dashed line.
Figure 6:
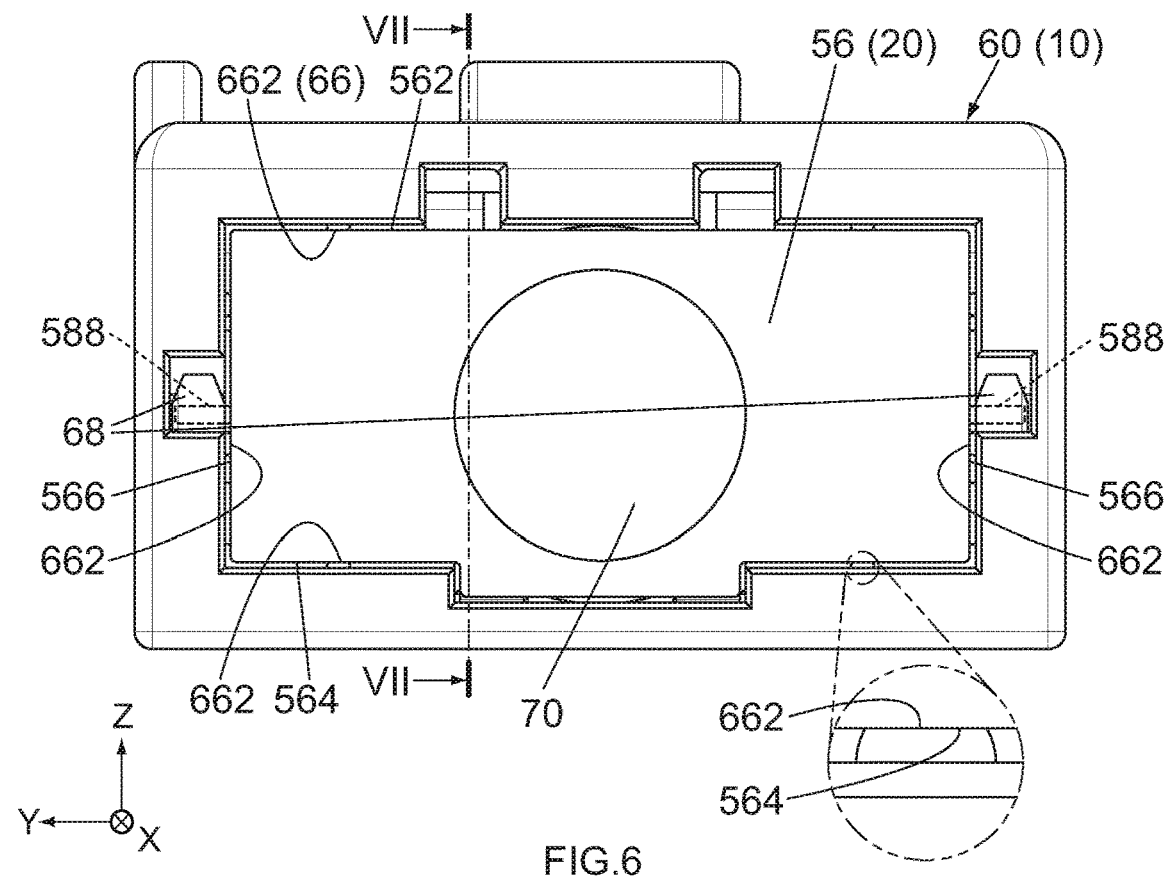
FIG. 6 is a rear view showing the connector of FIG. 1, wherein outlines of hidden stopped portions are illustrated with dashed line, and a part of the connector enclosed by two-dot chain line is enlarged and illustrated.

Referring to FIGS. 1 to 3, the connector 10 of the present embodiment comprises an inner structure 20, an outer housing 60 made of insulator and a retainer 68 made of insulator. Referring to FIG. 1, the inner structure 20 is a member to be attached to the cable 70, and the outer housing 60 is a member to accommodate the inner structure 20. The inner structure 20 is inserted into the outer housing 60 from behind together with the cable 70 attached thereto. Referring to FIG. 6, the retainer 68 prevents the inner structure 20 from coming off the outer housing 60. The connector 10 of the present embodiment has the aforementioned members. However, the present invention is not limited thereto. For example, the retainer 68 may be provided as necessary. The connector 10 may further comprise another member in addition to the aforementioned members.

Figure 8:
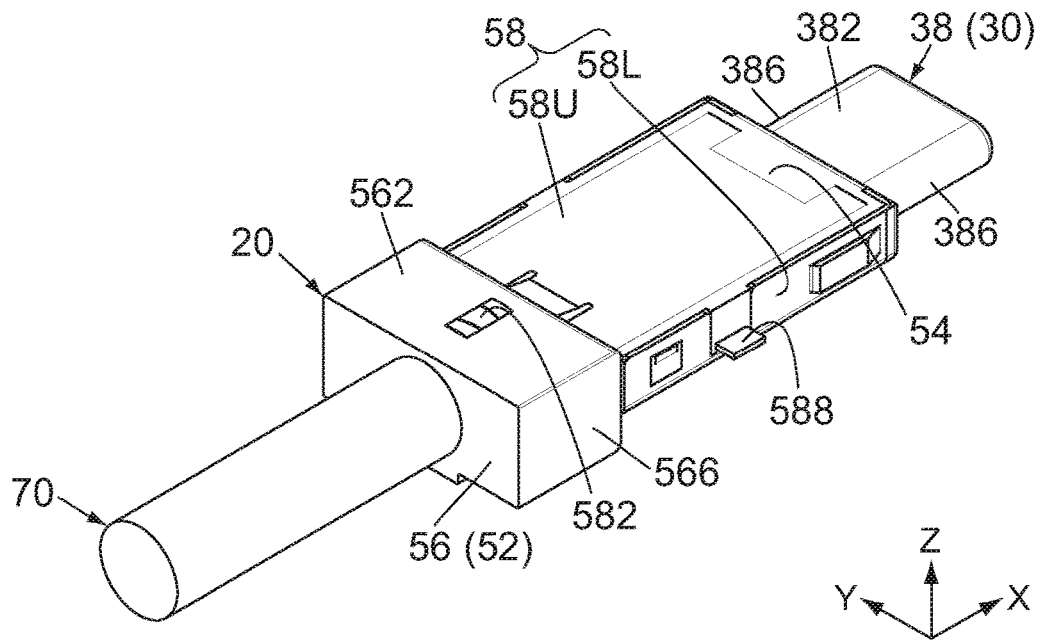
FIG. 8 is a perspective view showing an inner structure of the connector of FIG. 1, wherein the inner structure is attached to the cable.
Figure 12:
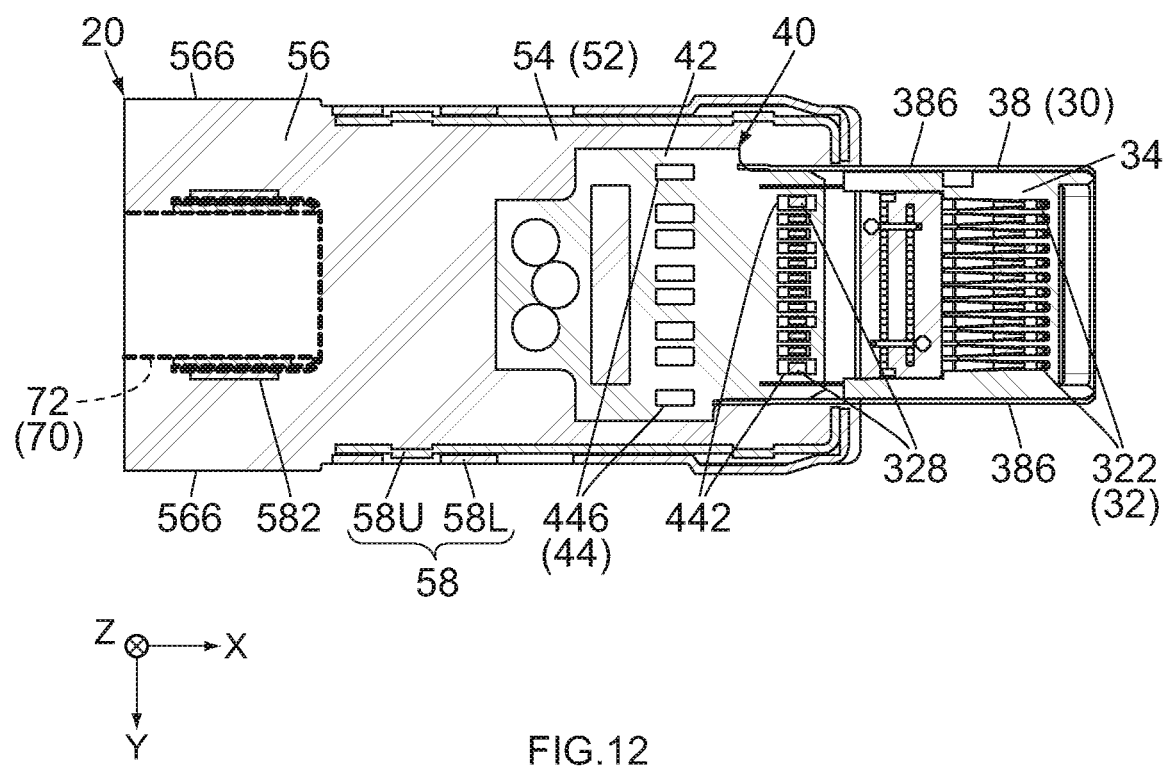
FIG. 12 is a cross-sectional view showing the inner structure of FIG. 11, taken along line XII-XII, wherein an outline of the inside part of the cable is illustrated with dashed line.
Figure 13:
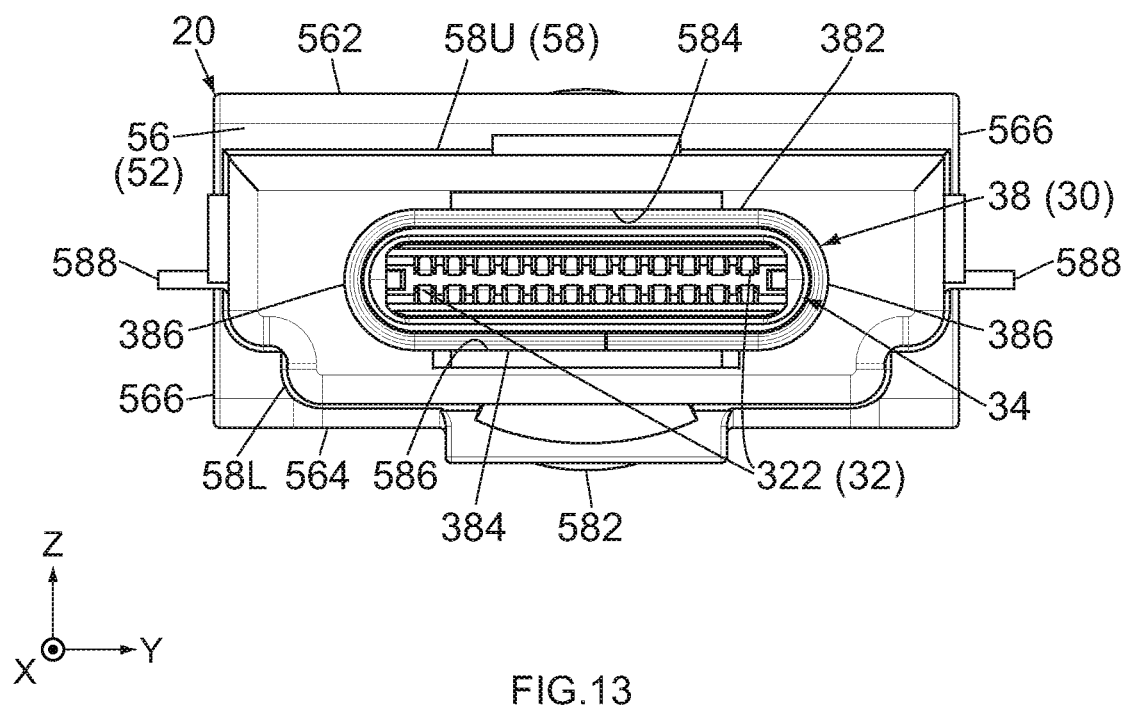
FIG. 13 is a front view showing the inner structure of FIG. 8.

As shown in FIG. 8, the inner structure 20 comprises a fit portion 30. Referring to FIGS. 12 and 13, the fit portion 30 comprises a plurality of terminals 32 each made of conductor, a holding member 34 made of insulator and a shell 38 made of metal. The terminals 32 according to the present embodiment are grouped into two rows in an upper-lower direction (Z-direction) perpendicular to the X-direction. The two rows of the terminals 32 are arranged to be mirror images of each other with respect to a horizontal plane (XY-plane). The terminals 32 of each row are arranged in a width direction (Y-direction: pitch direction) perpendicular to both the X-direction and the Z-direction and are held by the holding member 34. In other words, the holding member 34 holds the terminals 32. The shell 38 is fixed to the holding member 34 so as not to be moved relative to the holding member 34. The shell 38 almost entirely encloses the terminals 32 and the holding member 34 in a vertical plane (YZ-plane) perpendicular to the X-direction to electromagnetically shield the terminals 32.

Referring to FIGS. 8 to 11 and 13, the shell 38 of the present embodiment is a single metal plate with bends. In the YZ-plane, the shell 38 has a track shape which is long in the Y-direction. In detail, the shell 38 has an upper surface 382, a lower surface 384 and two side portions 386. The upper surface 382 and the lower surface 384 are located at opposite sides of the shell 38 in the Z-direction, respectively. The upper surface 382 is located above the lower surface 384 in the Z-direction. Each of the upper surface 382 and the lower surface 384 is a plane extending in parallel to the XY-plane. The two side portions 386 are located at opposite sides of the shell 38 in the Y-direction. In the YZ-plane, each of the side portions 386 has an arc shape which protrudes outward in the Y-direction.

Referring to FIG. 7, the fit portion 30 is fit to the mating fit portion 82 of the mating connector 80 under the mated state. In detail, the terminals 32 of the fit portion 30 are provided so as to correspond to the mating terminals 88 of the mating connector 80, respectively. Each of the terminals 32 is connected to the corresponding mating terminal 88 under the mated state. In other words, the fit portion 30 of the present embodiment is a part that is provided with the terminals 32 which are connected to the mating terminals 88, respectively, under the mated state.

The fit portion 30 of the present embodiment has the aforementioned structure. Moreover, the fit portion 30 of the present embodiment is a plug mateable with a universal serial bus (USB) 3.1 TYPE-C receptacle. However, the present invention is not limited thereto. For example, the shapes, the number and the arrangement of the terminals 32 are not specifically limited. The holding member 34 may be a single member or an assembly formed of a plurality of members and may have any shape, provided that the holding member 34 is able to hold the terminals 32. The shell 38 may be a single member or an assembly formed of a plurality of members and may have any shape, provided that the shell 38 is able to enclose the terminals 32 held by the holding member 34 to electromagnetically shield them. For example, the shell 38 may have a rectangular shape in the YZ-plane. Moreover, the fit portion 30 may further comprise another member in addition to the terminals 32, the holding member 34 and the shell 38.

As shown in FIG. 12, the inner structure 20 comprises a circuit board 40. The circuit board 40 comprises a base portion 42 made of insulator. The base portion 42 is attached to a rear end, or the negative X-side end, of the fit portion 30, so that the circuit board 40 is located rearward of the fit portion 30. The base portion 42 has a flat-plate shape in parallel to the XY-plane. The base portion 42 has an upper surface (positive Z-side surface) and a lower surface (negative Z-side surface) each of which is formed with a plurality of wire connection portions 44. Each of the wire connection portions 44 is a conductive pattern formed on the base portion 42. Thus, the circuit board 40 is provided with a plurality of the wire connection portions 44, and the wire connection portions 44 are located rearward of the fit portion 30.

Referring to FIGS. 7 and 12, each of the wire connection portions 44 has a front contact point 442, a rear contact point 446 and a connection pattern 444. The rear contact points 446 are located rearward of the front contact points 442. In each of the wire connection portions 44, the connection pattern 444 extends along the X-direction and connects the front contact point 442 and the rear contact point 446 with each other.

Referring to FIG. 7, the wire connection portions 44 are provided so as to correspond to the terminals 32, respectively, and the terminals 32 are in contact with the front contact points 442 of the wire connection portions 44, respectively. In detail, each of the terminals 32 has a connection portion 322 and a contact portion 328. Each of the connection portions 322 is connected to the corresponding mating terminal 88 under the mated state. Each of the contact portions 328 is in contact with the front contact point 442 of the corresponding wire connection portion 44. The rear contact points 446 are configured to be connected to the core wires 78 of the cable 70, respectively. Thus, the wire connection portions 44 are configured to connect the terminals 32 with the core wires 78 of the cable 70, respectively. In other words, when the connector 10 is attached to the cable 70, the rear contact points 446 are connected to the core wires 78, respectively, and the wire connection portions 44 connect the terminals 32 with the core wires 78, respectively. When the connector 10 attached to the cable 70 is mated with the mating connector 80, each of the core wires 78 of the cable 70 is electrically connected with the corresponding mating terminal 88 via the wire connection portion 44 and the terminal 32 each of which corresponds thereto.

The inner structure 20 of the present embodiment comprises the circuit board 40 and the terminals 32 which have the aforementioned structure. However, the present invention is not limited thereto. For example, the structure of the circuit board 40 and the structure of the terminals 32 are not limited to the present embodiment. Moreover, the inner structure 20 may comprise none of the circuit board 40, provided that the inner structure 20 comprises a plurality of the wire connection portions 44 which connect the terminals 32 with the core wires 78, respectively. For example, each of the terminals 32 may be directly connected to the corresponding core wire 78 of the cable 70 via soldering, etc. In this case, the soldered portions, etc. are the wire connection portions.

As shown in FIGS. 8 to 13, the inner structure 20 of the present embodiment comprises an additional shell 58. The additional shell 58 of the present embodiment comprises an upper shell 58U made of metal and a lower shell 58L made of metal. Each of the upper shell 58U and the lower shell 58L is a single metal plate with bends. The upper shell 58U and the lower shell 58L are vertically combined and fixed to each other, so that the additional shell 58 is formed. Referring to FIG. 12, the additional shell 58 almost entirely encloses the circuit board 40 in the YZ-plane to electromagnetically shield the circuit board 40.

Figure 9:
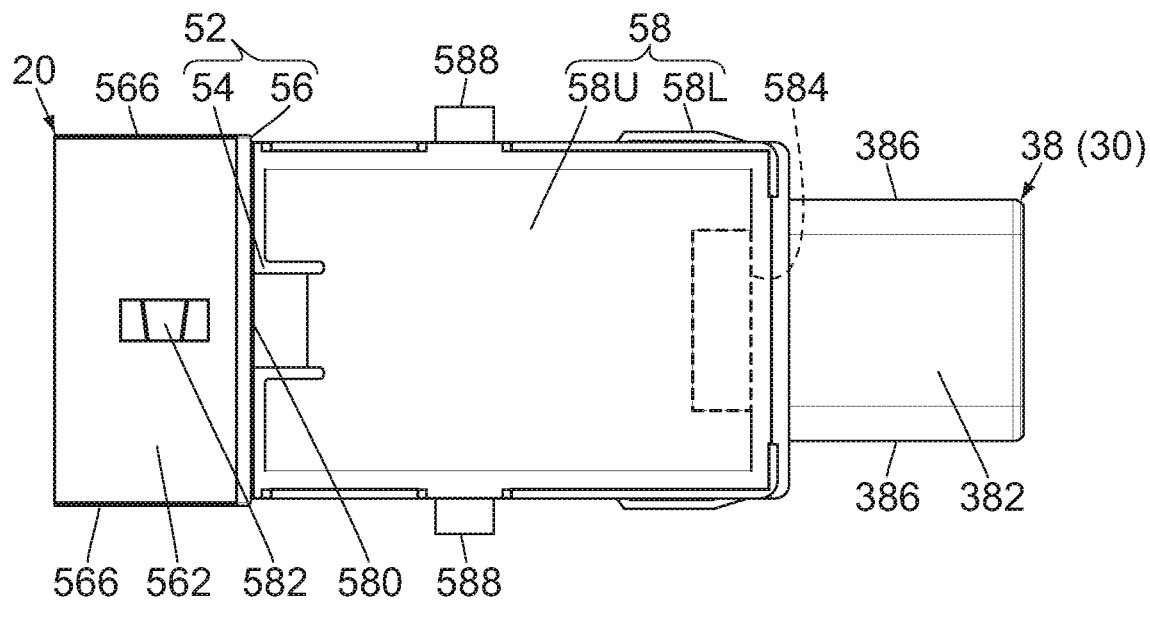
FIG. 9 is a top view showing the inner structure of FIG. 8, wherein the outside part of the cable is not illustrated, and an outline of a fixed portion of an upper shell is illustrated with dashed line.
Figure 10:
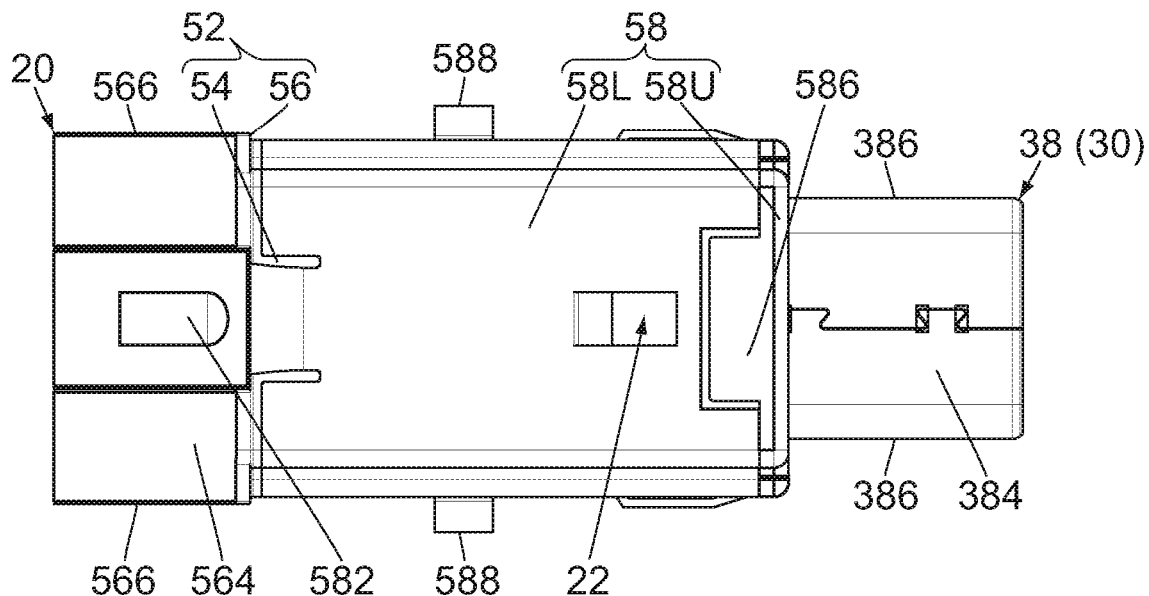
FIG. 10 is a bottom view showing the inner structure of FIG. 8, wherein the outside part of the cable is not illustrated.

Referring to FIGS. 9 and 13, the upper shell 58U has a fixed portion 584. Referring to FIGS. 10 and 13, the lower shell 58L has a fixed portion 586. Referring to FIGS. 7 and 13, the fixed portion 584 is fixed to the upper surface 382 of the shell 38 via soldering, etc., and the fixed portion 586 is fixed to the lower surface 384 of the shell 38 via soldering, etc. As a result, the additional shell 58 is fixed to the shell 38 so as not to be moved relative to the shell 38 and is electrically connected with the shell 38.

According to the present embodiment, the inner structure 20 comprises a shielding member formed of the three members, namely the shell 38, the upper shell 58U and the lower shell 58L, which are fixed to one another. However, the present invention is not limited thereto. For example, each of the shell 38, the upper shell 58U and the lower shell 58L may be a part of a single shielding member made of a single metal plate. In other words, the shielding member of the inner structure 20 may be a single metal plate with bends.

Figure 11:
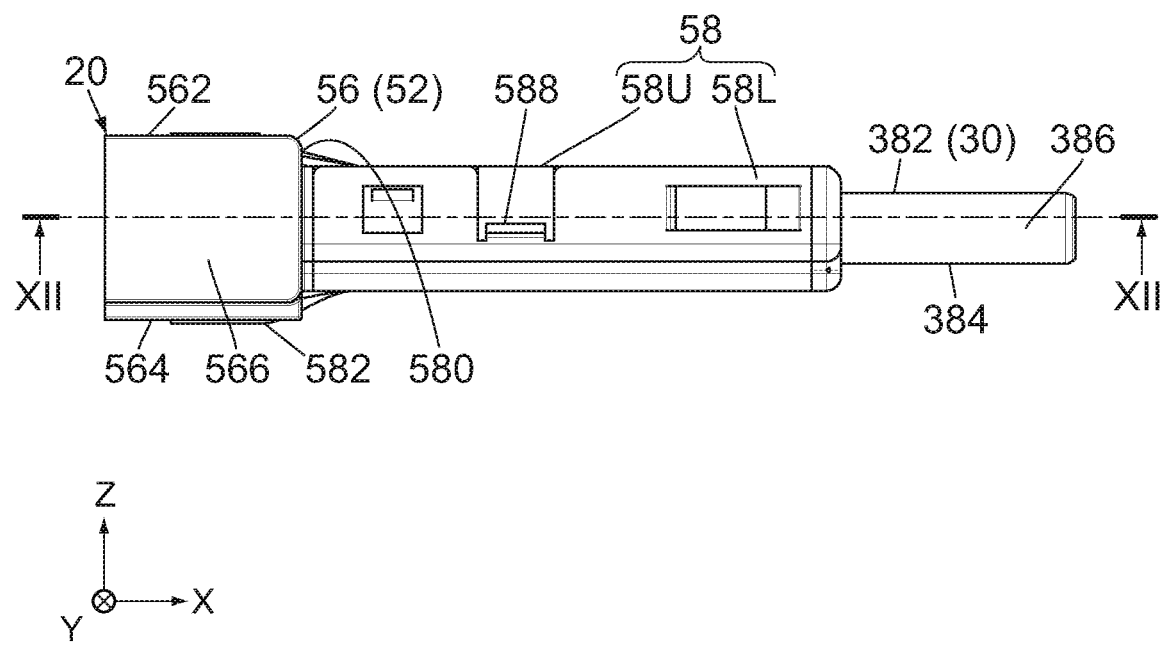
FIG. 11 is a side view showing the inner structure of FIG. 8, wherein the outside part of the cable is not illustrated.

Referring to FIGS. 9 and 11, the upper shell 58U has an assigned portion 580. The assigned portion 580 is a metal piece which has a flat-plate shape and is provided to a rear end of the upper shell 58U. Referring to FIGS. 9 to 11, the lower shell 58L has a crimp portion 582. The crimp portion 582 is provided to a rear end of the lower shell 58L. The crimp portion 582 is a metal piece which can be wound in an annular shape. Referring to FIG. 7, the assigned portion 580 is placed on the shield 74 which is folded back so as to cover the metal member 790 of the cable 70. The crimp portion 582 is wound around the shield 74 while the assigned portion 580 is partially located therebetween. The thus-wound crimp portion 582 crimps the cable 70 so that the assigned portion 580 is inserted between the shield 74 and the crimp portion 582. As a result, the cable 70 is fixed to the additional shell 58, and the shield 74 is grounded to the additional shell 58.

According to the present embodiment, the cable 70 is attached to the inner structure 20 as described above. However, an attachment method of the cable 70 to the inner structure 20 according to the present invention is not specifically limited.

Referring to FIGS. 8 and 12, the inner structure 20 comprises an insulation member 52 made of insulator such as resin. Referring to FIG. 12, the insulation member 52 has a protection portion 54 and a cable-holding portion 56. Thus, the inner structure 20 comprises the protection portion 54 and the cable-holding portion 56. In the present embodiment, the protection portion 54 and the cable-holding portion 56 are formed integrally to each other. In other words, each of the protection portion 54 and the cable-holding portion 56 is a part of the single insulation member 52. Thus, the protection portion 54 and the cable-holding portion 56 are fixed to each other so as not be moved relative to each other. However, the protection portion 54 and the cable-holding portion 56 may be members separable to each other.

In the present embodiment, the protection portion 54 is located rearward of the fit portion 30. The protection portion 54 is formed of insulation material such as resin which is filled in a space enclosed by the additional shell 58. The insulation material that forms the protection portion 54 covers a front end part of the upper shell 58U partially. The cable-holding portion 56 is molded at the back of the insulation material that forms the protection portion 54. The cable 70 and the crimp portion 582 of the lower shell 58L are buried in the cable-holding portion 56. Thus, the cable-holding portion 56 is located rearward of the protection portion 54.

The protection portion 54 of the present embodiment fills almost all the inner space enclosed by the additional shell 58 with no gap, so that the circuit board 40 is fixed to the additional shell 58 via the protection portion 54. For example, even when the inner structure 20 receives impact, the impact hardly affects the circuit board 40. More specifically, even when the inner structure 20 receives impact, the contact between the contact portions 328 of the terminals 32 and the front contact points 442 of the wire connection portions 44 can be securely kept, and the contact between the core wires 78 (see FIG. 7) of the cable 70 and the rear contact points 446 of the wire connection portions 44 can be securely kept. In other words, the protection portion 54 protects the wire connection portions 44. As described above, the protection portion 54 of the present embodiment is formed so as to fill almost all the space between the additional shell 58 and the circuit board 40 with no gap. However, the protection portion 54 may be formed in any way, provided that the wire connection portions 44 are protected.

The cable-holding portion 56 is configured to directly or indirectly hold the jacket 72 of the cable 70 in the YZ-plane. In other words, when the connector 10 (see FIG. 1) is attached to the cable 70, the cable-holding portion 56 directly or indirectly holds the jacket 72 of the cable 70 in the YZ-plane. According to the present embodiment, the cable-holding portion 56 directly holds a part of the jacket 72 and indirectly holds another part of the jacket 72 via some portion such as the crimp portion 582 of the lower shell 58L. However, the present invention is not limited thereto, but the cable-holding portion 56 may hold the jacket 72 in any way.

Referring to FIGS. 8 to 11 and 13, the cable-holding portion 56 of the present embodiment has a rectangular shape in the YZ-plane. In detail, the cable-holding portion 56 of the present embodiment has an upper surface 562, a lower surface 564 and two side portions 566. The lower surface 564 has two parts separated from each other in the Y-direction. The upper surface 562 and the lower surface 564 are located at opposite sides of the cable-holding portion 56 in the Z-direction, respectively. The upper surface 562 is located above the lower surface 564 in the Z-direction. Each of the upper surface 562 and the lower surface 564 is a plane extending in parallel to the XY-plane. The two side portions 566 are located at opposite sides of the cable-holding portion 56 in the Y-direction, respectively. Each of the side portions 566 is a plane extending in parallel to the XZ-plane.

The cable-holding portion 56 of the present embodiment has the aforementioned shape. However, the cable-holding portion 56 may have any shape, provided that the cable-holding portion 56 partially holds the jacket 72 (see FIG. 12) of the cable 70 (see FIG. 12). For example, the cable-holding portion 56 may have a track shape in the YZ-plane. In detail, in the YZ-plane, each of the side portions 566 may have an arc shape which protrudes outward in the Y-direction.

Figure 14:
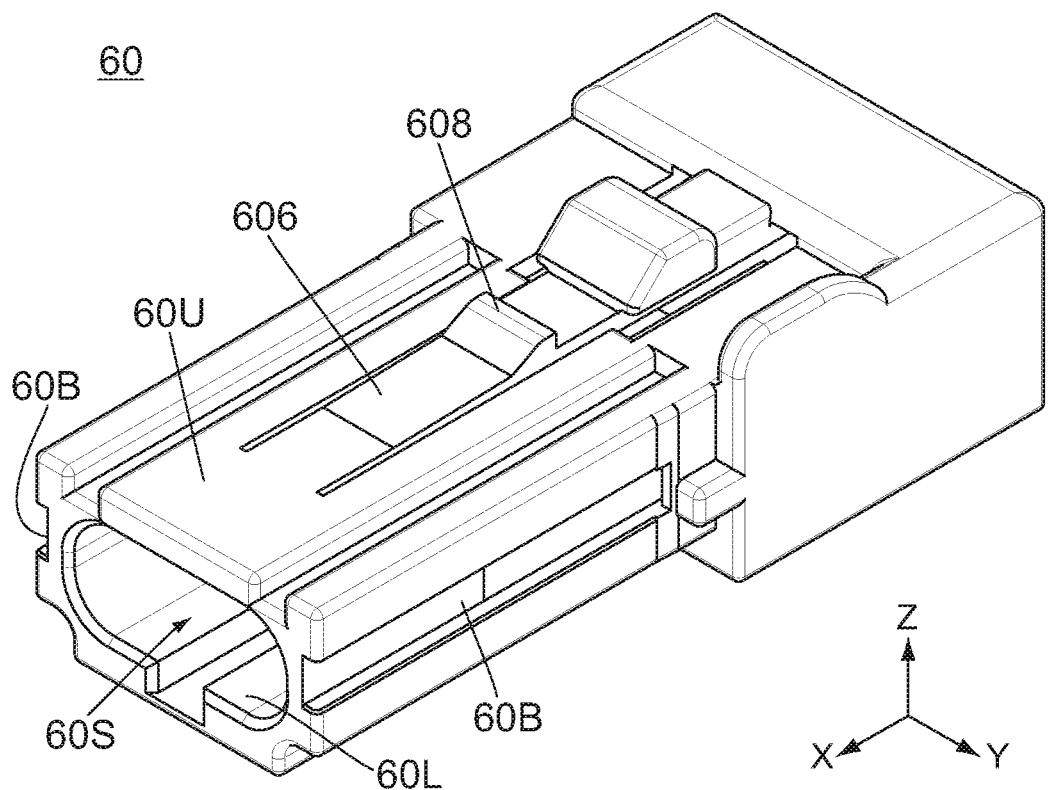
FIG. 14 is a perspective view showing an outer housing of the connector of FIG. 1.
Figure 15:
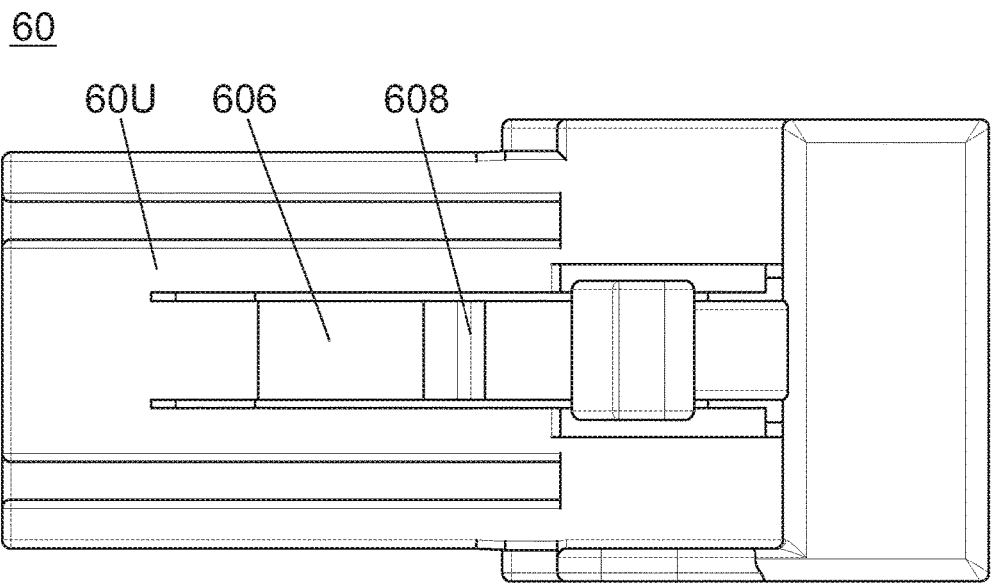
FIG. 15 is a top view showing the outer housing of FIG. 14.
Figure 16:
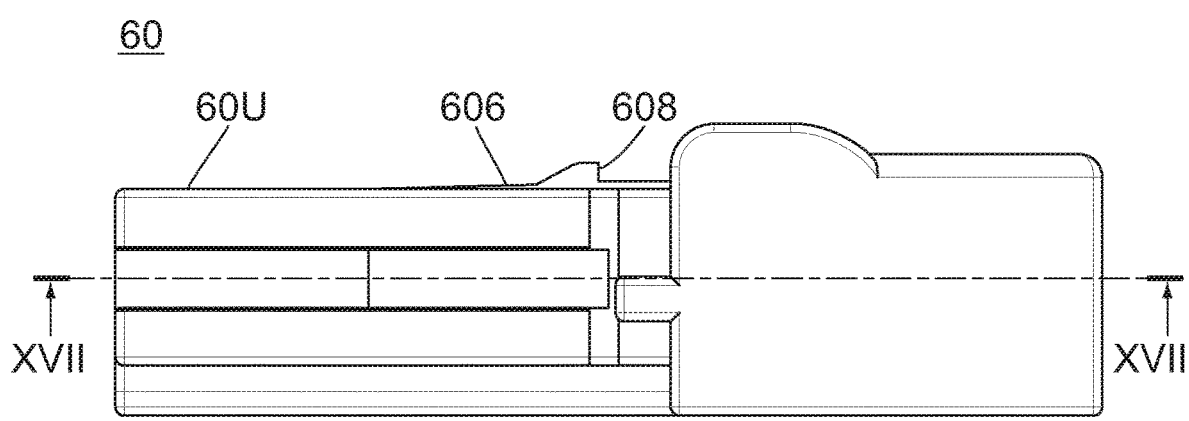
FIG. 16 is a side view showing the outer housing of FIG. 14.
Figure 17:
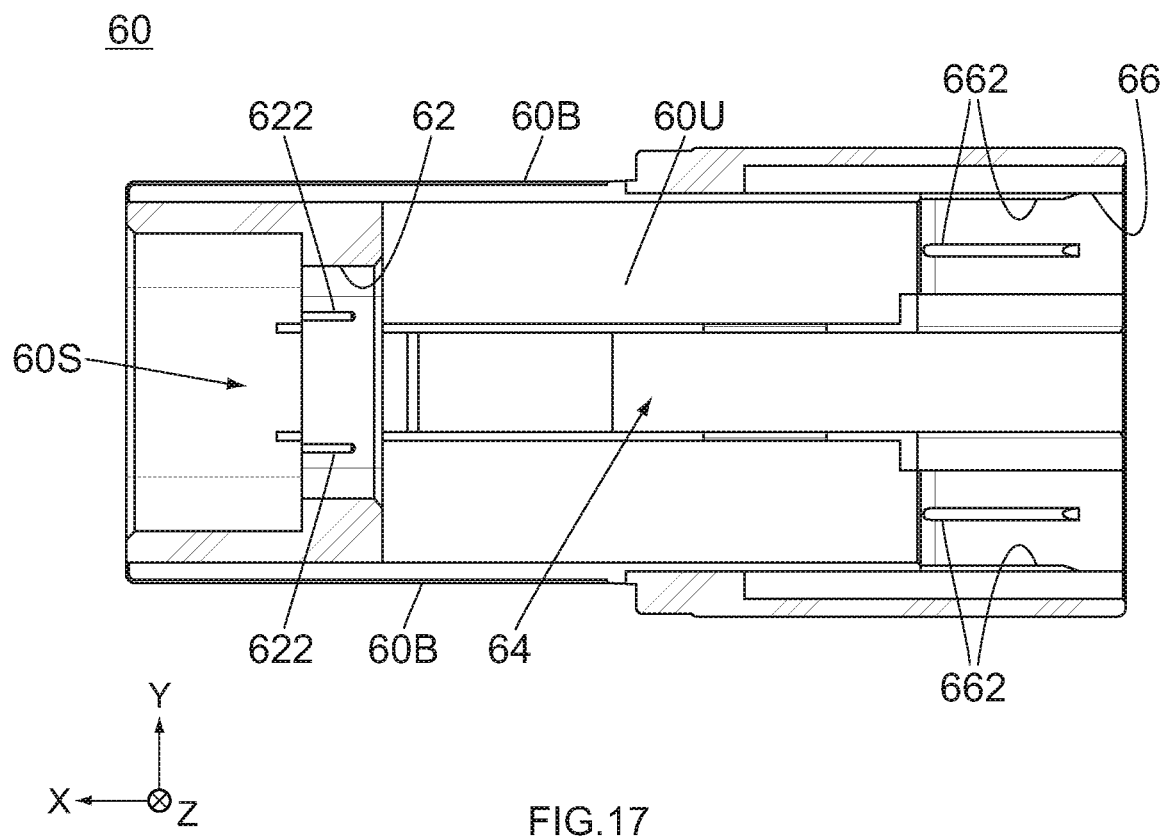
FIG. 17 is a cross-sectional view showing the outer housing of FIG. 16, taken along line XVII-XVII.
Figure 18:
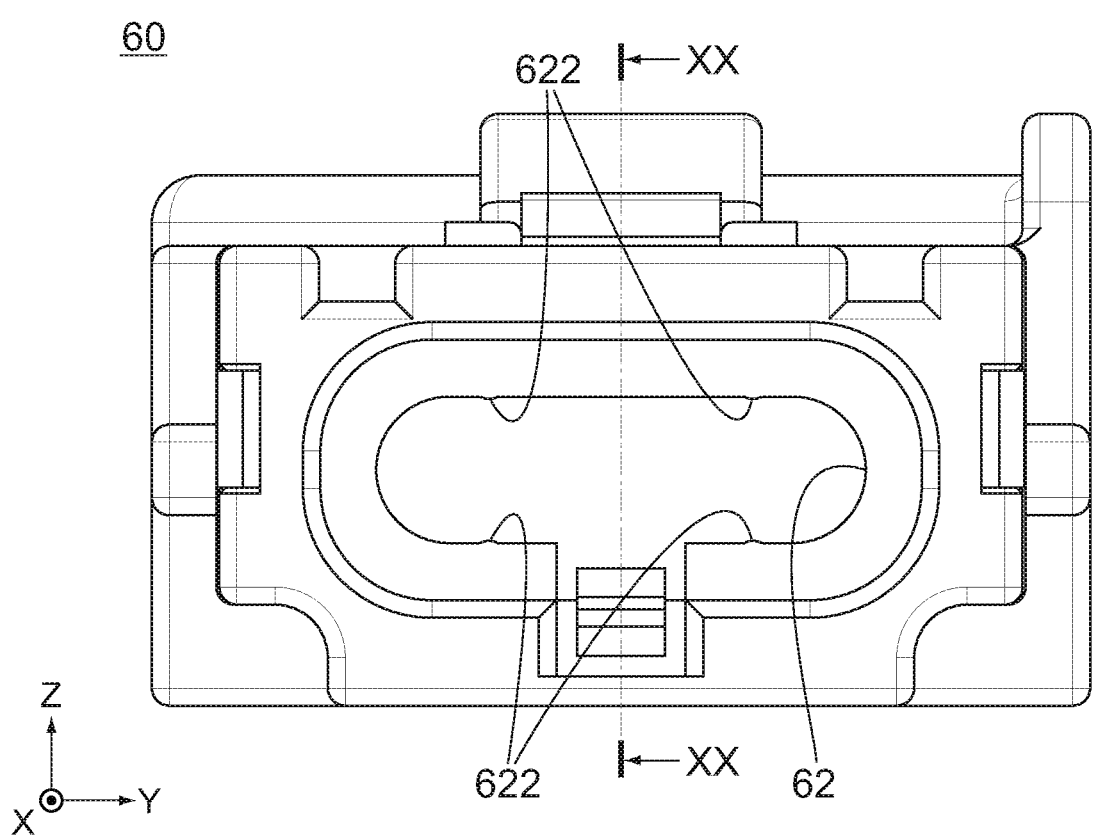
FIG. 18 is a front view showing the outer housing of FIG. 14.
Figure 20:
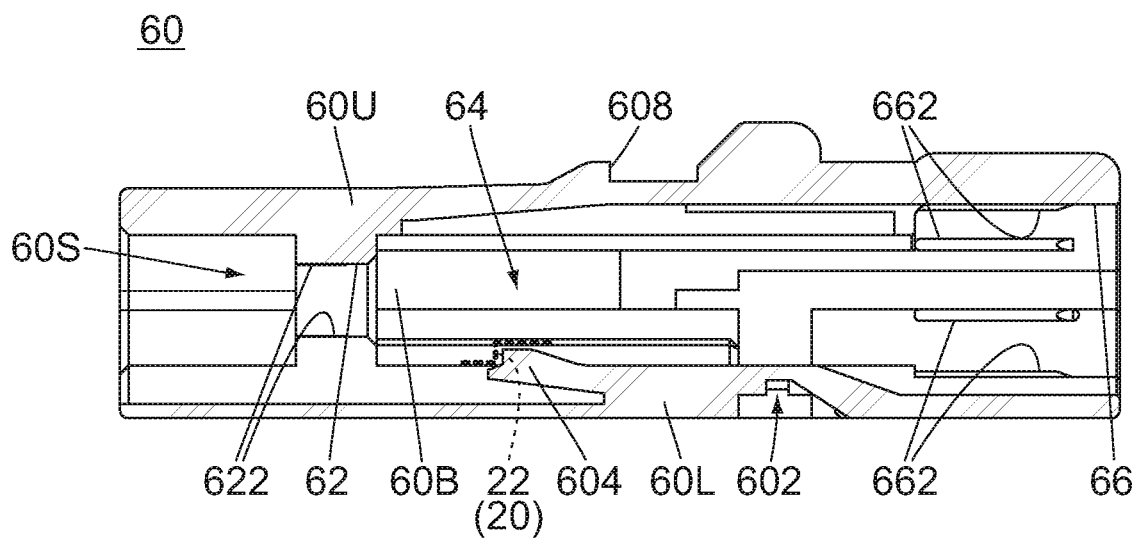
FIG. 20 is a cross-sectional view showing the outer housing of FIG. 18, taken along line XX-XX, wherein dashed line shows a position of an engagement portion of the inner structure under a state where the inner structure is accommodated in the outer housing.
Figure 21:
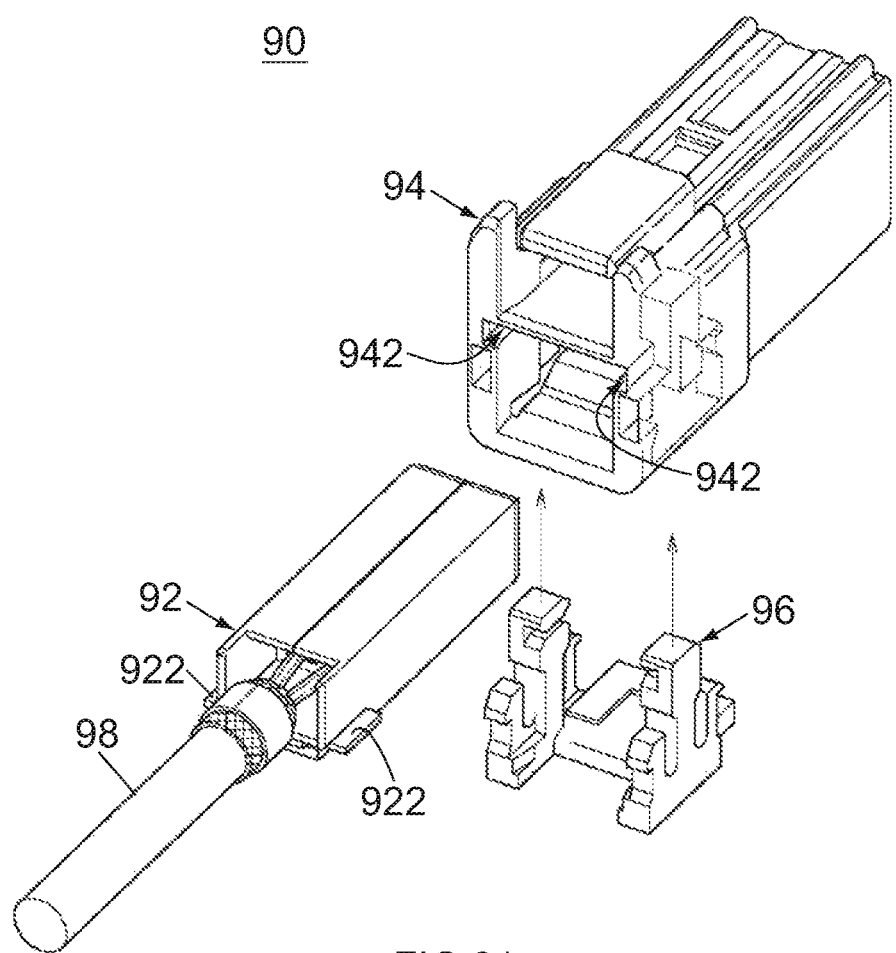
FIG. 21 is an exploded, perspective view showing a connector of Patent Document 1.

Referring to FIGS. 14 to 16, the outer housing 60 of the present embodiment is a single molded member made of resin and has a rectangular column-like shape extending in the X-direction as a whole. Referring to FIGS. 14, 17 and 20, the outer housing 60 has an inner space 60S. The inner space 60S is a hole which passes through the inside of the outer housing 60 along the X-direction. The inner space 60S is enclosed by an upper plate 60U, a lower plate 60L and two side plates 60B of the outer housing 60 in the YZ-plane.

Referring to FIGS. 14 to 16, the outer housing 60 has a spring portion 606 and a lock portion 608. The spring portion 606 is supported by the upper plate 60U of the outer housing 60 to be resiliently deformable. The lock portion 608 is supported by the spring portion 606 to be movable in the Z-direction. Referring to FIG. 7, the lock portion 608 locks a mating lock portion (not shown) of the mating connector 80 under the mated state, so that the mated state is maintained.

Referring to FIGS. 1 and 4, the inner structure 20 is inserted into the inner space 60S of the outer housing 60 from behind to be accommodated in the inner space 60S after the attachment of the cable 70, so that the connector 10 is assembled. Referring to FIG. 3, in the thus-assembled connector 10, a part of the lower shell 58L of the inner structure 20 is exposed outward through a hole formed in the side plates 60B of the outer housing 60.

Referring to FIGS. 8, 9 and 13, the lower shell 58L of the inner structure 20 has two stopped portions 588. Each of the stopped portions 588 has a flat-plate shape in parallel to the XY-plane and projects outward in the Y-direction. Referring to FIG. 10, the inner structure 20 is provided with an engagement portion 22. The engagement portion 22 is a space located at a lower end, or the negative Z-side end, of the inner structure 20 and opens downward, or in the negative Z-direction. Referring to FIG. 20, the lower plate 60L of the outer housing 60 is formed with an attachment hole 602 and a lance 604. The attachment hole 602 passes through the lower plate 60L in the Z-direction. The lance 604 extends forward in the inner space 60S and is resiliently deformable.

Referring to FIGS. 2 and 7, after the inner structure 20 is accommodated in the outer housing 60, the retainer 68 is inserted into the inner space 60S through the attachment hole 602. Referring to FIG. 6, the retainer 68 inserted in the outer housing 60 is partially located rearward of the stopped portions 588 of the inner structure 20. The thus-arranged retainer 68 regulates a rearward movement of the inner structure 20. In other words, the retainer 68 prevents the inner structure 20 from coming off. In addition, referring to FIG. 20, the lance 604 is engaged with the engagement portion 22 to prevent the inner structure 20 from coming off. According to the present embodiment, the connector 10 has a retaining mechanism including the retainer 68 and another retaining mechanism including the lance 604, and the inner structure 20 is retained in the outer housing 60 so that the inner structure 20 is hardly moved in the X-direction. However, the present invention is not limited thereto, but the connector 10 may comprise any retaining mechanism having a required structure as necessary.

Referring to FIG. 17, the outer housing 60 has a front holding portion 62, an accommodation portion 64 and a rear holding portion 66. The accommodation portion 64 is a middle part of the inner space 60S in the X-direction. Referring to FIGS. 4 and 7, the accommodation portion 64 accommodates the protection portion 54 of the inner structure 20 together with the additional shell 58. In other words, the accommodation portion 64 is a portion for accommodating the protection portion 54. Referring to FIG. 17, the front holding portion 62 is located forward of the accommodation portion 64, and the rear holding portion 66 is located rearward of the accommodation portion 64. In other words, the front holding portion 62 and the rear holding portion 66 are apart from each other with the accommodation portion 64 located therebetween in the X-direction.

In the present embodiment, the front holding portion 62 is formed of an inner wall surface which is located in the vicinity of a front end of the inner space 60S, and the rear holding portion 66 is formed of an inner wall surface which is located in the vicinity of a rear end of the inner space 60S. However, the present invention is not limited thereto, but the structure and the arrangement of the front holding portion 62, the accommodation portion 64 and the rear holding portion 66 can be variously modified, provided that the front holding portion 62, the accommodation portion 64 and the rear holding portion 66 are arranged in this order rearward along the X-direction.

Referring to FIGS. 4 and 7, the most of the inner structure 20 is located in the inner space 60S while nearly no space is formed between the inner structure 20 and an inner wall surface of the inner space 60S. Therefore, the inner structure 20 accommodated in the inner space 60S is hardly moved in the YZ-plane.

In particular, the front holding portion 62 of the outer housing 60 holds the fit portion 30 of the inner structure 20 so that the fit portion 30 is not moved from a predetermined position in the YZ-plane. In detail, the shell 38 of the inner structure 20 is partially pressed against the front holding portion 62 in the YZ-plane, so that a movement of the shell 38 in the Y-direction and another movement of the shell 38 in the Z-direction are reduced. In addition, a rotational movement of the shell 38 in the YZ-plane is reduced. Meanwhile, the rear holding portion 66 of the outer housing 60 holds the cable-holding portion 56 of the inner structure 20 so that the cable-holding portion 56 is not moved from a predetermined position in the YZ-plane. In detail, the cable-holding portion 56 is partially pressed against the rear holding portion 66 in the YZ-plane, so that a movement of the cable-holding portion 56 in the Y-direction and another movement of the cable-holding portion 56 in the Z-direction are reduced. In addition, a rotational movement of the cable-holding portion 56 in the YZ-plane is reduced.

As described above, according to the present embodiment, the inner structure 20 is held by the two holding portions, namely the front holding portion 62 and the rear holding portion 66, which are apart from each other in the X-direction with the accommodation portion 64 located therebetween. In particular, according to the present embodiment, the front holding portion 62 holds the shell 38 of the fit portion 30 of the inner structure 20, which is a front end part of the inner structure 20, to prevent a movement of the fit portion 30 in the YZ-plane, and the rear holding portion 66 holds the cable-holding portion 56 of the inner structure 20, which is a rear end part of the inner structure 20, to prevent a movement of the cable-holding portion 56 in the YZ-plane. According to this mechanism, the inner structure 20 is hardly moved relative to the outer housing 60 even when the cable 70 receives force. This mechanism according to the present embodiment reduces wobble of the inner structure 20 even when the cable 70 is pulled or moved.

Referring to FIG. 7, the front holding portion 62 directly holds the fit portion 30. According to this structure, even if the cable 70 is pulled or moved to cause a slight movement of the cable-holding portion 56, the slight movement hardly affects the fit portion 30. Therefore, even if the cable 70 is pulled or moved during a mating process of the connector 10 with the mating connector 80, the fit portion 30 can be accurately positioned to the mating fit portion 82 in the YZ-plane by keeping the outer housing 60 at a predetermined position. Moreover, the members of the inner structure 20 are fixed to one another as previously described. This structure prevents a rotational movement, in which the fit portion 30 and the cable-holding portion 56 are twisted with respect to each other, even if the cable 70 is pulled or moved.

Figure 5:
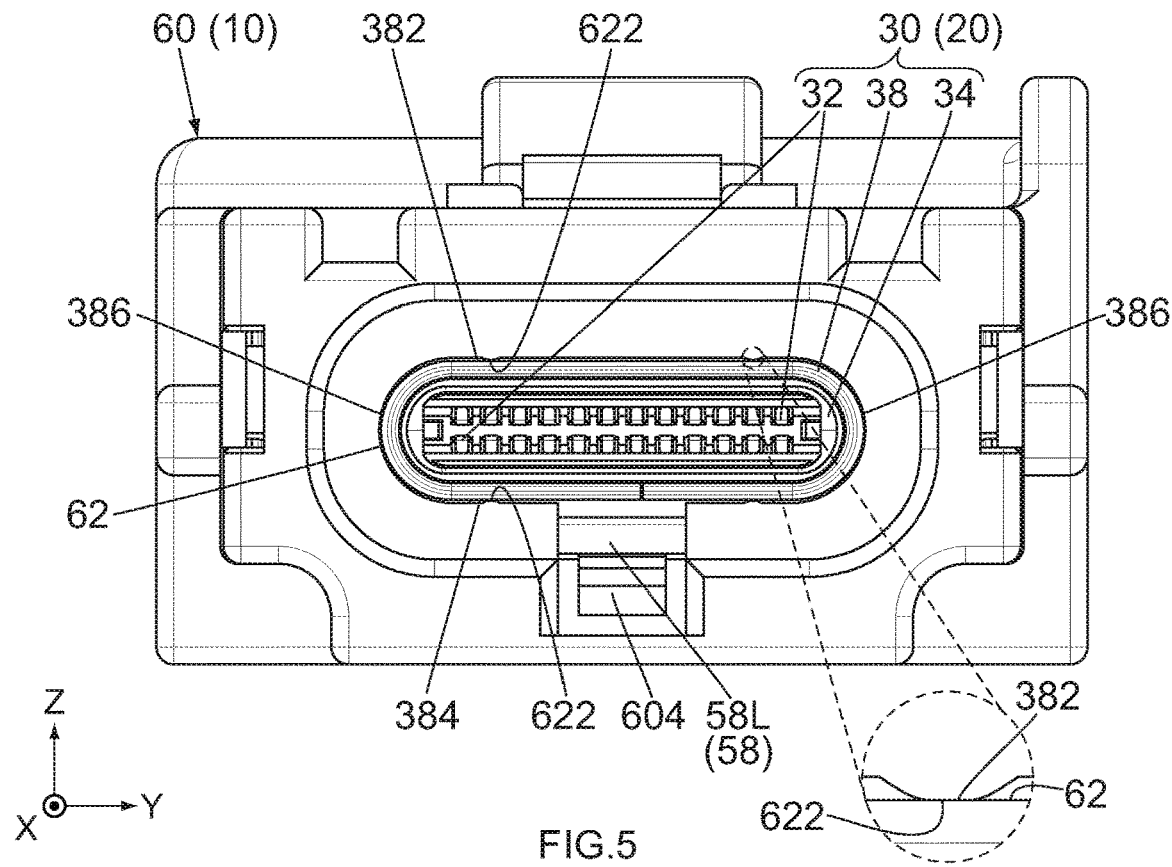
FIG. 5 is a front view showing the connector of FIG. 1, wherein a part of the connector enclosed by dashed line is enlarged and illustrated.

Referring to FIG. 5, the front holding portion 62 of the present embodiment supports a point or an area of each of the upper surface 382, the lower surface 384 and the side portions 386 of the shell 38, and sandwiches and presses the shell 38 both in the Z-direction and in the Y-direction. In other words, the shell 38 of the fit portion 30 is press-fit or lightly press-fit to the front holding portion 62 to be held by the front holding portion 62.

In detail, in the YZ-plane, the inner wall surface that forms the front holding portion 62 has a size slightly larger than another size of the shell 38. Referring to FIGS. 17 to 20, the front holding portion 62 is provided with four front ribs 622. Two of the front ribs 622 are formed on an upper part, or the positive Z-side part, of the inner wall surface of the front holding portion 62 and project downward while extending along the X-direction. Remaining two of the front ribs 622 are formed on a lower part, or the negative Z-side part, of the inner wall surface of the front holding portion 62 and project upward while extending along the X-direction. Referring to FIG. 5, according to the aforementioned structure, the shell 38 is inserted into the front holding portion 62 so that the front ribs 622 are pressed and resiliently deformed. In addition, the shell 38 is inserted into the front holding portion 62 while opposite ends of the shell 38 in the Y-direction are brought into contact with and rubbed against the front holding portion 62.

According to the present embodiment, the front holding portion 62 sandwiches and presses the shell 38 in the Z-direction by reaction force of the pressed and resiliently deformed front ribs 622. In addition, the opposite ends of the shell 38 in the Y-direction are pressed against opposite ends of the front holding portion 62 in the Y-direction, respectively, so that the front holding portion 62 sandwiches and presses the shell 38 in the Y-direction. This structure more securely holds the fit portion 30. However, the present invention is not limited thereto. For example, the front holding portion 62 may be in point contact with or in surface contact with the shell 38 without having the front ribs 622. Moreover, when the front ribs 622 are provided, the number and the arrangement of the front ribs 622 can be variously modified as necessary.

Referring to FIG. 6, the rear holding portion 66 of the present embodiment supports a point or an area of each of the upper surface 562, the lower surface 564 and the side portions 566 of the cable-holding portion 56 and sandwiches and presses the cable-holding portion 56 both in the Z-direction and in the Y-direction. In other words, the cable-holding portion 56 is press-fit or lightly press-fit to the rear holding portion 66 to be held by the rear holding portion 66.

Figure 19:
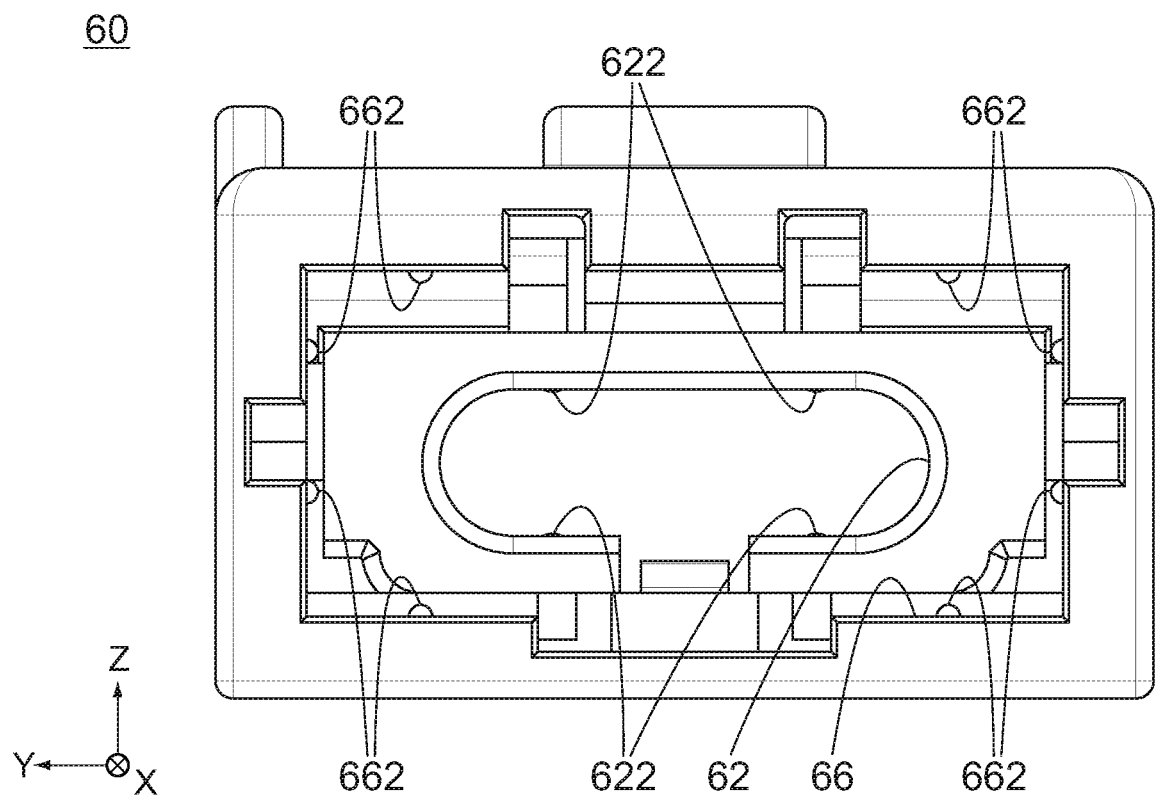
FIG. 19 is a rear view showing the outer housing of FIG. 14.

In detail, in the YZ-plane, the inner wall surface that forms the rear holding portion 66 has a size slightly larger than another size of the cable-holding portion 56. Referring to FIGS. 17, 19 and 20, the rear holding portion 66 is provided with eight rear ribs 662. Two of the rear ribs 662 are formed on an upper part of the inner wall surface of the rear holding portion 66 and project downward while extending along the X-direction. Other two of the rear ribs 662 are formed on a lower part of the inner wall surface of the rear holding portion 66 and project upward while extending along the X-direction. The other four of the rear ribs 662 are formed on side parts of the inner wall surface of the rear holding portion 66 in the Y-direction and project inward in the Y-direction while extending along the X-direction. Referring to FIG. 6, according to the aforementioned structure, the cable-holding portion 56 is inserted into the rear holding portion 66 so that the rear ribs 662 are pressed and resiliently deformed.

According to the present embodiment, the rear holding portion 66 sandwiches and presses the cable-holding portion 56 both in the Z-direction and in the Y-direction by reaction force of the pressed and resiliently deformed rear ribs 662. This structure more securely holds the cable-holding portion 56. However, the present invention is not limited thereto. For example, the rear holding portion 66 may be in point contact with or in surface contact with the cable-holding portion 56 without having the rear ribs 662. Moreover, when the rear ribs 662 are provided, the number and the arrangement of the rear ribs 662 can be variously modified as necessary.

Referring to FIG. 13, in the inner structure 20 of the present embodiment, a size of the cable-holding portion 56 in the YZ-plane is larger than another size of the fit portion 30 in the YZ-plane. In detail, when the cable-holding portion 56 and the fit portion 30 are projected on the YZ-plane, the projected fit portion 30 is located within the projected cable-holding portion 56. Referring to FIG. 19 together with FIG. 13, the front holding portion 62 and the rear holding portion 66 correspond to the fit portion 30 and the cable-holding portion 56, respectively, so that a size of the rear holding portion 66 in the YZ-plane is larger than another size of the front holding portion 62 in the YZ-plane. In detail, if the rear holding portion 66 and the front holding portion 62 are projected on the YZ-plane, the projected front holding portion 62 is located within the projected rear holding portion 66.

According to the aforementioned structure, the inner structure 20 can be inserted into the outer housing 60 while no part thereof except the cable-holding portion 56 is brought into contact the rear holding portion 66. This structure prevents expansion of the rear holding portion 66 in the YZ-plane which might be caused because of force applied to the rear holding portion 66 during insertion of the inner structure 20 into the outer housing 60. Thus, according to the present embodiment, the inner structure 20 can be inserted into the outer housing 60 without degrading the holding ability of the rear holding portion 66.

The structure of the connector 10 according to the present embodiment can be further variously modified in addition to the already explained modifications. For example, the outer housing 60 may have any structure, provided that the outer housing 60 is able to accommodate the inner structure 20 and is able to reduce the wobble of the inner structure 20 as described above. For example, the outer housing 60 may be formed of a plurality members combined to one another.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector attachable to a cable having a jacket and a plurality of core wires, the connector being mateable with an object, which has a mating fit portion, along a front-rear direction, wherein:
   the connector comprises an inner structure and an outer housing;
   the inner structure comprises a fit portion, a plurality of wire connection portions, a protection portion and a cable-holding portion;
   the fit portion is fit to the mating fit portion under a mated state where the connector and the object are mated with each other;
   the fit portion comprises a plurality of terminals, a holding member and a shell;
   the holding member holds the terminals;
   the shell encloses the terminals and the holding member in a perpendicular plane perpendicular to the front-rear direction;
   the wire connection portions and the protection portion are located rearward of the fit portion;
   the wire connection portions are configured to connect the terminals with the core wires of the cable, respectively;
   the protection portion protects the wire connection portions;
   the cable-holding portion is located rearward of the protection portion;
   the cable-holding portion is configured to directly or indirectly hold the jacket of the cable in the perpendicular plane;
   the outer housing has a front holding portion, an accommodation portion and a rear holding portion;
   the accommodation portion accommodates the protection portion;
   the front holding portion is located forward of the accommodation portion and holds the shell to prevent a movement of the fit portion in the perpendicular plane; and
   the rear holding portion is located rearward of the accommodation portion and holds the cable-holding portion to prevent a movement of the cable-holding portion in the perpendicular plane;
   the inner structure comprises a circuit board and an additional shell;

the circuit board is provided with the wire connection portions;

each of the wire connection portions has a front contact point, a rear contact point and a connection pattern;

the rear contact points are located rearward of the front contact points;

in each of the wire connection portions, the connection pattern connects the front contact point and the rear contact point with each other;

the terminals are in contact with the front contact points, respectively;

the rear contact points are configured to be connected to the core wires of the cable, respectively; and the additional shell encloses the circuit board in the perpendicular plane.

2. A connector attachable to a cable having a jacket and a plurality of core wires, the connector being mateable with an object, which has a mating fit portion, along a front-rear direction, wherein:

the connector comprises an inner structure and an outer housing;

the inner structure comprises a fit portion, a plurality of wire connection portions, a protection portion and a cable-holding portion;

the fit portion is fit to the mating fit portion under a mated state where the connector and the object are mated with each other;

the fit portion comprises a plurality of terminals, a holding member and a shell;

the holding member holds the terminals;

the shell encloses the terminals and the holding member in a perpendicular plane perpendicular to the front-rear direction;

the wire connection portions and the protection portion are located rearward of the fit portion;

the wire connection portions are configured to connect the terminals with the core wires of the cable, respectively;

the protection portion protects the wire connection portions;

the cable-holding portion is located rearward of the protection portion;

the cable-holding portion is configured to directly or indirectly hold the jacket of the cable in the perpendicular plane;

the outer housing has a front holding portion, an accommodation portion and a rear holding portion;

the accommodation portion accommodates the protection portion;

the front holding portion is located forward of the accommodation portion and holds the shell to prevent a movement of the fit portion in the perpendicular plane;

the rear holding portion is located rearward of the accommodation portion and holds the cable-holding portion to prevent a movement of the cable-holding portion in the perpendicular plane;

the inner structure comprises an insulation member; and each of the protection portion and the cable-holding portion is a part of the single insulation member.

3. The connector as recited in claim 2, wherein:

the inner structure comprises a circuit board and an additional shell;

the circuit board is provided with the wire connection portions;

each of the wire connection portions has a front contact point, a rear contact point and a connection pattern;

the rear contact points are located rearward of the front contact points;

in each of the wire connection portions, the connection pattern connects the front contact point and the rear contact point with each other;

the terminals are in contact with the front contact points, respectively;

the rear contact points are configured to be connected to the core wires of the cable, respectively; and the additional shell encloses the circuit board in the perpendicular plane.

4. The connector as recited in claim 1, wherein:

the shell has an upper surface, a lower surface and two side portions;

the upper surface of the shell is located above the lower surface of the shell in an upper-lower direction perpendicular to the front-rear direction;

the side portions of the shell are located at opposite sides of the shell, respectively, in a width direction perpendicular to both the front-rear direction and the upper-lower direction; and the front holding portion supports a point or an area of each of the upper surface, the lower surface and the side portions of the shell and sandwiches the shell both in the upper-lower direction and in the width direction.

5. The connector as recited in claim 4, wherein:

the cable-holding portion has an upper surface, a lower surface and two side portions;

the upper surface of the cable-holding portion is located above the lower surface of the cable-holding portion in the upper-lower direction;

the side portions of the cable-holding portion are located at opposite sides of the cable-holding portion, respectively, in the width direction; and the rear holding portion supports a point or an area of each of the upper surface, the lower surface and the side portions of the cable-holding portion and sandwiches the cable-holding portion both in the upper-lower direction and in the width direction.

6. The connector as recited in claim 1, wherein:

the cable-holding portion has an upper surface, a lower surface and two side portions;

the upper surface of the cable-holding portion is located above the lower surface of the cable-holding portion in an upper-lower direction perpendicular to the front-rear direction;

the side portions of the cable-holding portion are located at opposite sides of the cable-holding portion, respectively, in a width direction perpendicular to both the front-rear direction and the upper-lower direction; and the rear holding portion supports a point or an area of each of the upper surface, the lower surface and the side portions of the cable-holding portion and sandwiches the cable-holding portion both in the upper-lower direction and in the width direction.

7. The connector as recited in claim 1, wherein the fit portion is a plug mateable with a universal serial bus (USB) 3.1 TYPE-C receptacle.

8. A connector attachable to a cable having a jacket and a plurality of core wires, the connector being mateable with an object, which has a mating fit portion, along a front-rear direction, wherein:

the connector comprises an inner structure and an outer housing;

the inner structure comprises a fit portion, a plurality of wire connection portions, a protection portion and a cable-holding portion;

the fit portion is fit to the mating fit portion under a mated state where the connector and the object are mated with each other;

the fit portion comprises a plurality of terminals, a holding member and a shell;

the holding member holds the terminals;

the shell encloses the terminals and the holding member in a perpendicular plane perpendicular to the front-rear direction;

the wire connection portions and the protection portion are located rearward of the fit portion;

the wire connection portions are configured to connect the terminals with the core wires of the cable, respectively;

the protection portion protects the wire connection portions;

the cable-holding portion is located rearward of the protection portion;

the cable-holding portion is configured to directly or indirectly hold the jacket of the cable in the perpendicular plane;

the outer housing has a front holding portion, an accommodation portion and a rear holding portion;

the accommodation portion accommodates the protection portion;

the front holding portion is located forward of the accommodation portion and holds the shell to prevent a movement of the fit portion in the perpendicular plane;

the rear holding portion is located rearward of the accommodation portion and holds the cable-holding portion to prevent a movement of the cable-holding portion in the perpendicular plane;

the outer housing is a single member; and a size of the cable-holding portion in the perpendicular plane is larger than a size of the fit portion in the perpendicular plane.

9. A harness comprising the connector and the cable as recited in claim 1, wherein the connector is attached to the cable.

* * * * *